ELECTRONIC PRESET REVOLUTION COUNTER DEVICE

Filed May 3, 1952 3 Sheets-Sheet 1

FIG. I

INVENTOR.
ROBERT P. DIMMER
BY McWalter Owen
ATTY.

Oct. 16, 1956 R. P. DIMMER 2,766,936

ELECTRONIC PRESET REVOLUTION COUNTER DEVICE

Filed May 3, 1952 3 Sheets-Sheet 2

INVENTOR.
ROBERT P. DIMMER
BY [signature]
ATTY.

Oct. 16, 1956 R. P. DIMMER 2,766,936

ELECTRONIC PRESET REVOLUTION COUNTER DEVICE

Filed May 3, 1952 3 Sheets-Sheet 3

INVENTOR.
ROBERT P. DIMMER

BY Mc Walter Owen

ATTY.

United States Patent Office 2,766,936

Patented Oct. 16, 1956

2,766,936

ELECTRONIC PRESET REVOLUTION COUNTER DEVICE

Robert P. Dimmer, Chicago, Ill., assignor to Automatic Electric Laboratories, Inc., Chicago, Ill., a corporation of Delaware Application May 3, 1952, Serial No. 286,000

6 Claims. (Cl. 235—132)

This invention relates generally to preset counting devices and particularly to electronic preset revolution counter devices.

The invention utilizes a series of circuits which can be preset to correspond to a series of predetermined numbers which are desired to be counted. This has particular application to those counting operations which differ from each other because of unequal counts to be made of moving objects or of revolutions of a rotating element.

One of the objects of the invention is to provide a counter device to be used with a universal coil winding machine for the winding of multiple winding induction coils. It enables the operator to preset the number of turns required on each of a plurality of different windings. After the initial preset, the winding machine will wind the first winding and then stop after the proper number of turns have been wound; upon subsequent actuation by the operator, the machine will wind the second winding and then stop at the correct number of turns; and so on until all of the plurality of windings are completed. The counter device will automatically step in sequence from the first preset number to the last preset number without the attention of the operator. After the last winding is wound, the counter device returns automatically to the first preset number, ready for the next winding operation.

Another object is to provide circuits which in conjunction with relays will automatically reset the counter device to "zero" prior to switching to the next preset circuit.

Another object is the use of preset circuits which can be set to correspond to predetermined numbers desired to be counted so that upon actuation thereof, the grids of the tubes in the counter are electrically marked in automatic manner in accordance with the preset information just prior to the commencement of the next counting operation.

A further object consists of using an operating pulse upon the completion of a count to operate a solenoid in conjunction with a gas tube to stop movement and consequent counting of the objects or the rotation of an element and to automatically switch to the next preset circuit.

Another object is to provide manual controls for effecting changes in resetting and marking operations required by operational failures or non-sequential counting operations.

Figure 1:
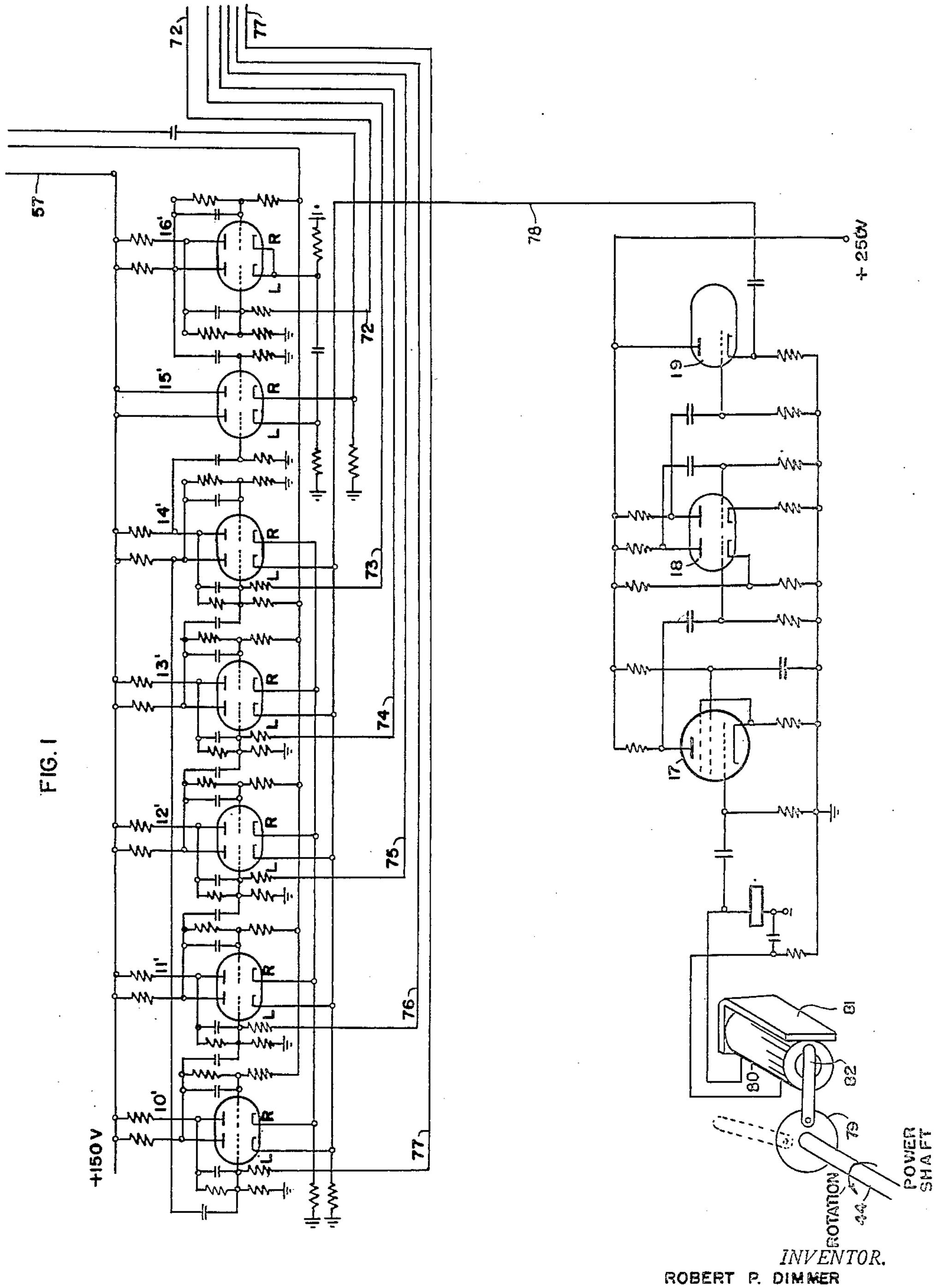
Figure 2:
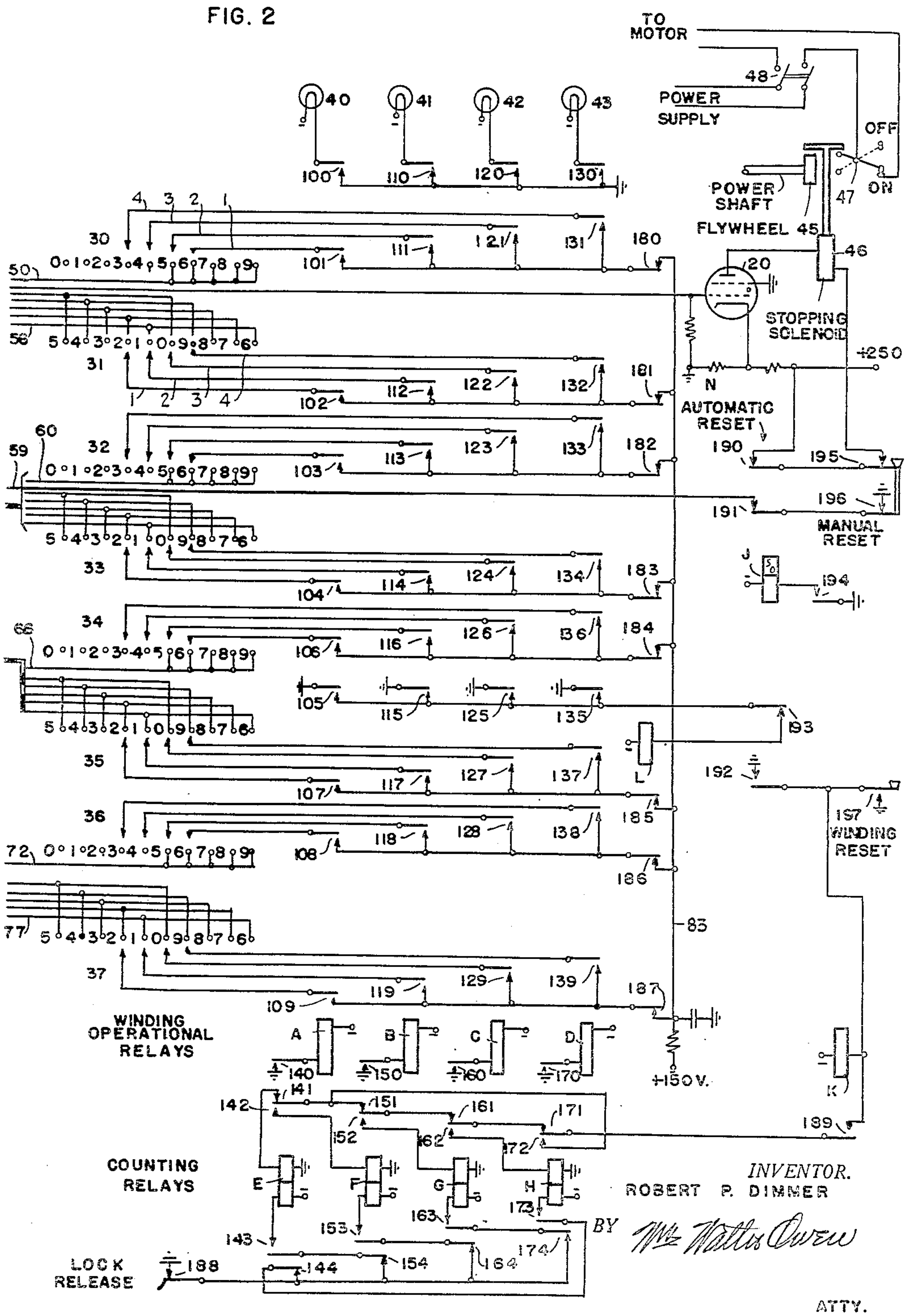
Figure 3:
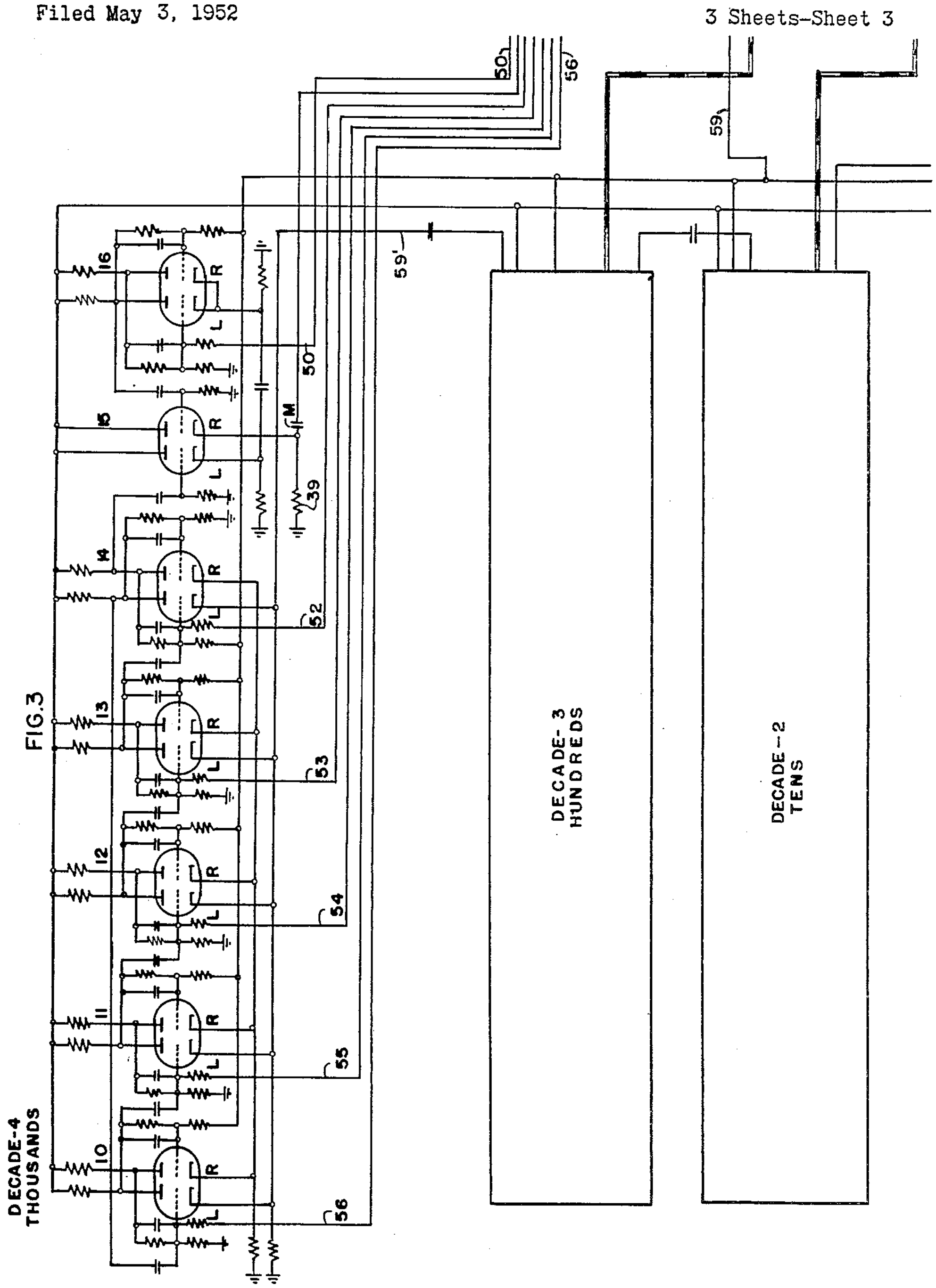

A better understanding of the invention will be had upon perusal of the specification taken in conjunction with the accompanying drawing composed of Figure 1 illustrating the pulse generator and the first decade counter, Figure 2 illustrating the preset circuits and the operating devices, and Figure 3 showing the other three decade counters comprising the counter device.

The problem of counting objects or revolutions of a rotating device presents itself in industrial applications especially on production lines. Various counters are used; these are usually of the mechanical or the electromagnetic type. The present invention was developed to be used with a coil winding machine in which it is desired to count the number of turns in a plurality of windings placed on a coil core; but it may have various applications elsewhere.

Generation of pulses which are subsequently counted by the counter is achieved electromagnetically in the following way: A longitudinal strip 82, made of magnetizing material such as soft iron is attached to a non-magnetic pulley 79 which in turn is mounted on the driving element 44 of the winding machine as shown in the lower left corner of Figure 1. The position of the electromagnet 80 is adjusted so that a single pulse can be obtained and impressed upon the grid of tube 17. The position of the strip 82 is rather critical because if it is too close or if it covers the total magnetic field of the coil, two pulses will show up in the output. When properly adjusted, the magnetic disturbance in the electromagnet will cause a single pulse for each rotation. This pulse is amplified by tube 17, of a type such as 6AU6, and passes to the grid of the next tube 18, of a type such as 5963, which is biased to cut-off. Since the pulse is positive, it will drive this tube 18 to conduction. By selecting a certain bias voltage, this tube 18 will be caused to conduct only by pulses of large amplitude thus eliminating noise, caused by operating voltage variations, etc. This tube 18 allows only the positive half of the pulse to be passed to the next tube 19, such as 12AU7, which is a cathode follower and functions as a coupling device in transmitting the pulse to any one of the counting tubes in the first decade of the counter device as shown in Figure 1. At the input to the first decade counter, this pulse is an almost perfect square wave of sufficient amplitude to start the counter device. Attention is directed to the fact that all the decades comprising this counter are identical in construction. Decades #2 and #3 are shown in block form to simplify the drawing, but they are identical in construction to decades #1 and #4 which are shown in detail in Figures 1 and 3.

In the present application, the counter consists of four decades and will count to the sum of 10,000. Each decade counter consists of a scale-of-five ring counter and a scale-of-two counter. The cathode follower 15 of each decade, such as 12AU7, is used to operate the scale-of-two counter once for each cycle of the scale-of-five ring counter. The counter device will not be described in detail as it is conventional except for the use of positive pulses to drive the ring counters and the use of cathode followers for isolation, pulse amplitude and polarity discrimination. The counter device is similar to the one described by A. H. Faulkner in his application, "Time Interval Meter," Serial No. 154,136, filed April 5, 1950, now Patent No. 2,724,553. Generally, counter devices can be set up in either of one of two ways. The first method consists of setting the decade counters so that they will start from zero upon their initiation and continue to count until the predetermined count is reached. The second method consists of presetting the complement of the desired number to be reached as is used in this invention. To explain further, suppose it is desired to wind a coil of 2,917 turns. In the first type of counter device, counting would start at zero and continue until the predetermined number would be reached at which time the counting operation would be brought to a halt. In a decade system of the aforementioned type it would require a series of recording stages to hold the various decade pulses until the total count had been completed. In the second method, using for illustrative purposes a four decade counter device, the complement of the number 2,917 would be 10,000—2,917=7,083. By means of the preset circuits employed in this invention, the figure 7,083 would be initially preset on the decade counters. Since these counters continue counting from whatever figure they were initially preset, the counter device would commence counting from the preset figure 7,083 and continue counting until the ultimate figure 10,000 would be reached and then stop, which would correspond to the count of 2,917. In this method of counting no recording stages are required to store the preset intelligence. An actuating device operates upon completion of a count in response to receipt of the last pulse of the predetermined number to halt the counting operation and switch to the next preset circuit. By using this system no special relays or circuits are required to handle zeros.

The preset switches 30—37 are incorporated within the preset circuits over which a positive potential may be impressed on the grids of the counter tubes in accordance with the setting of the preset switches. Relays A, B, C and D are the winding relays and represent the four different windings which are to be wound on a single bobbin. These relays are stepped by the counting chain relays E, F, G and H. Relay K is the steering relay which initiates the operation of the above counting relays. These latter five relays constitute a standard counting chain. The purpose of relay L is to remove the positive potential after it has been momentarily impressed upon the grids of the tubes in accordance with the settings on the preset switches corresponding to various predetermined numbers; otherwise, damage would result to the tubes from continuous application of the high positive potential impressed thereon. When the 10,000 count has been reached, an operating pulse from the last decade #4 fires the gas tube 20, such as 2D21, to energize the solenoid or other activating device which will stop the operation of the coil winding machine as well as the counting operation. After a brief instant, relay J will operate and be instrumental in switching to the next preset circuit and in marking the tubes in the various decades in accordance with the next predetermined number. The switching, which is performed automatically after each predetermined count has been completed, follows a sequence and reverts automatically to the first preset circuit after all the predetermined numbers have been run through. The counting operation need not be restricted to following the sequential norm. Any preset circuit may be selected by manual operation of the Winding Reset switch. The same flexibility applies to the operation of resetting the counter to zero. The counter can be reset to zero at any time by manual operation of the Manual Reset switch.

Although the present invention has been specifically adapted to a coil winding machine for counting the revolutions of a rotating element, which is instrumental in initiation of counting pulses, the invention can be used also with different modes of pulse initiation such as interruptions of a photoelectric light beam, reciprocating member motion, contact closures, and many other actions which are representative of counts.

*Mode of operation*

A more detailed description of the operation of winding four different windings on one coil will now be considered. Suppose it is necessary to wind four windings consisting of the following number of turns of the same or of varying wire sizes, 2,917, 8,000, 5,000 and 9,000. As previously explained, the operator would determine the complement of each number and these would be 7,083, 2,000, 5,000 and 1,000, respectively. Since the first winding number is represented by its complement namely, 7,083, this number would be preset on the unit by positioning wipers 1 (shown by arrowheads) of both preset switches 30 and 31 on their respective contacts "7" which is the first numeral of the complement number representing the "thousands." The next numeral of the complement number represents the "hundreds" position and it would be set up by positioning the wipers 1 of both switches 32 and 33 on their respective contacts "0." The "tens" numeral in the complement number would be preset by setting the wipers 1 of both switches 34 and 35 on their respective contacts "8." The last figure of the complement number which is the "units" digit is preset by moving the wipers 1 of both switches 36 and 37 onto their respective contacts "3." The complement of the number of turns, which represents the first winding to be wound, is thus preset as explained above. Similarly the complements of the numbers of turns of the second, third and fourth windings to be wound are preset on the unit by proper setting of the wipers 2, 3, 4, respectively. This is possible because of the type of preset switches used. Each switch has four wipers, any one of which can be positioned over any contact whether such contact is already occupied by another wiper or not. This makes it possible to wind four windings possessing the same number of turns.

After the complements of the various winding numbers have been preset, winding operation is begun by anchoring the wire end to the bobbin mounted on an arbor. Then the preset circuit is energized by depressing momentarily the Winding Reset switch which closes the contacts 197 and thereby energizes the steering relay K. As a result, relay E is energized momentarily over the following path: ground through upper winding on relay E, through the break contacts 141 on relay E, through the break contacts 151 on relay F, through the break contacts 161 on relay G, through the break contacts 171 on relay H, through the make contacts 189 on relay K, and through the winding on relay K to —battery. This energizing circuit however is immediately opened up as soon as the break contacts 141 on relay E open up. But this momentary energization is sufficient to close the make contacts 143 on relay E to establish a lock circuit over the following: ground through the break contacts 188 of the Lock Release switch, through the break contacts 154 on relay F, through the make contacts 143 on relay E, and through the lower winding on relay E to —battery. The break contacts 144 open at one point the incomplete lock release circuit. The make contacts 140 close to complete a circuit to the winding of relay A. Thereupon the relay A energizes and completes the following functions: closes the make contacts, 101, 102, 103, 104, 106, 107, 108 and 109 thus making it possible to impress a potential of +150 volts, present on line 83, upon the grids of the counter tubes thus marking them in accordance with the first preset number; immediately after the aforementioned operation, energizes relay L, a slow-operate relay, when the last to make "Y" contacts 105 close; and lights up the indicator lamp 40 by completing its power circuit by closure of the make contacts 100. The indicator lamp discloses to the operator which preset circuit is being used or about to be used. Relay L, which operates a moment later after relay A has become operated, opens the break contacts 180—187 thus removing the positive potential applied from the line 79 to the grids of preselected counting tubes. Function of relay L is to remove, after a brief application, the positive potential impressed upon the grids of the counting tubes so as to prevent damage to their structures.

It is necessary at this time to describe briefly the operation of the counter device and the effect of resetting and marking operations thereon. Each decade counter consists of a scale-of-five counter and a scale-of-two counter. Operation of the decade counter #1, "units," will be described but it is to be understood that the operation of the other decade counters is similar except for operation in the higher order. The first five tubes 10′—14′ are twin triodes and are used to count up to 10. Since each pulse to be counted requires at least one tube for proper operation, it is evident that some means must be employed so that a dual function may be imposed upon each individual tube, in order that five tubes be capable of counting up to 10 pulses. This is accomplished by using a cathode follower, the L triode of the tube 15′, to operate the scale-of-two counter, tube 16′, for each cycle of operation of the scale-of-five counter. A second cathode follower, R triode of the tube 15′, delivers a driving pulse to the input of the succeeding decade counter for each cycle of operation of the scale-of-two counter. Both of the cathode followers are included in the tube 15' and the scale-of-two counter comprises tube 16'. Each tube contains a twin triode; L designates the left triode and R designates the right triode. It should be noted that the circuits of the scale-of-five and the scale-of-two counters are arranged so that only one triode of each twin triode tube can conduct at one time.

The plate of the L triode of each counting tube is coupled to the grid of the L triode of the succeeding counting tube by means of a condenser thus providing for the sequential operation. The R triodes of tubes 10', 11', 12', 13' and 16' are normally conducting whereas only the L triode of tube 14' is normally conducting. The aforementioned conditions represent the "zero" position of the counter device.

If it is desired to make a count of 2,917, its complement, 7,083, would be preset on the counter device by manual operation of the preset switches as previously described. Thereafter a potential of +150 volts would be momentarily impressed upon the left grids of particular counting tubes by way of the preset switches 30—37. Thus the L triode of tube 12', which corresponds to the "unit" digit "3" of the preset number 7,083, would begin to conduct. Similarly, a particular counting tube representing the "tens" digit "8" and the "hundred" digit "0" would begin to conduct in decades #2 and #3 respectively. The counting tube 11, representing the "thousand" digit "7" in decade #4, will also begin to conduct. It is to be noted that a presetting of any number in the range 5–9 involves two circuits. Consider the digit "7" aforementioned in the example. First, the wiper 1 of preset switch 30 would be moved over the contact "7"; second, the wiper 1 of the preset switch 31 would be moved over the contact "7." The first preset switch 30 prepares a circuit over which a positive potential may be applied from line 83 to the L grid of the flip-flop tube 16 so that the counting tubes in this decade #4 will begin to count in the second range namely, 5–9.

The second preset switch 31 prepares a circuit over which a positive potential may be similarly applied to the L grid of tube 11 so that the decade counter will begin to count from 7 (thousand) upward until 10,000 is reached. The process of applying potential to the grids of particular counting tubes is termed "marking."

Should it be necessary that the counter device be returned to its normal or "zero" position herein termed "resetting," all that is required is the operation of either the Automatic Reset or the Manual Reset. Operation of either of the above resets will remove the ground present at contacts 196 which ground is applied over line 59 to the R grids of all the counting tubes except tube 14 (and others similarly located) in each decade counter. Removal of said ground renders all operated triodes non-operative except the L triode of tube 14' in decade #1 and tubes similarly located in the other decades, such as tube 14 in decade #4.

Operation of the winding machine is initiated by closing the main switch 48 shown in Figure 2 and putting the switch 47 to "on" position. As the machine operates, the strip 82 rotates and intermittently closes a magnetic circuit existing in the electromagnet 80. A pulse is generated per each revolution of the power shaft 44 and subsequently amplified by the tube 17. Tube 18 allows only the positive portion of the pulse to pass to the cathode follower 19 which serves as a coupling device. The output pulse of tube 19 is fed over line 78 to the cathodes of L triodes of the counting tubes found in decade #1.

As it will be recalled, tube 12' has been previously marked by application of positive potential to the grid of L triode over the line 75, through the contact 3, on switch 37, through the wiper 1 which has been previously set on contact 3, through the make contacts 109 on relay A, and through the break contacts 187 on relay L to +150.

This represents the marking of decade counter #1 in setting up the digit "3" of the number 7,083. Decade counter #1 will begin to count the incoming pulses from 3 upward to 10 at which time a pulse will be sent to the next succeeding decade counter #2. Upon the reaching the count of 10, decade counter #1 reverts itself to normal and begins to count pulses from 0 upward to 10 at which time another pulse is sent to the next succeeding decade counter #2. Hence for each count of 10 reached by the decade counter #1, a pulse is sent to the next succeeding decade counter #2. And for each count of 10 reached by the decade counter #2, a pulse is sent to the next succeeding decade counter #3. Similarly for each count of 10 reached by the decade counter #3, a pulse is transmitted to the next decade counter #4. It is to be remembered that the counting of pulses in each decade counter #2, #3 and #4 starts from the marked tube in each respective decade counter as hereinbefore described for operation of decade counter #1.

After due time, the first coil is wound to its preset number of turns. The last pulse of the preset number causes the R triode of cathode follower tube 15 to conduct and to produce an operating slave pulse across its cathode resistor 39. This slave pulse passes through the capacitor M and is impressed upon the grid of the thyratron tube 20. Thereupon tube 20 "fires" and initiates the stopping of the winding machine. Stopping is accomplished by use of a solenoid which upon actuation applies brakes to the power shaft of the winding machine and opens the power circuit to the winding machine motor. This is shown in a simplified manner in Figure 2 by having the solenoid 46 directly applying stopping force upon the flywheel 45 attached to the power shaft 44.

The stopping solenoid 46 is energized over the following path: ground through the resistor N, through the tube 20, through the winding on the solenoid 46, through the break contacts 195 of the Manual Reset switch, through the break contacts 190 on relay J and to the +250 of the power source. The make contacts 194 of solenoid 46 close and energize relay J. Relay J, upon operation, opens its break contacts 190 thus opening the energizing circuit of the solenoid 46 so that the solenoid returns to normal. Relay J has slow-operate characteristics so that the solenoid is given a sufficient time interval to have effective stopping action. The break contacts 191 on relay J open up and remove the positive potential applied from ground to the grids of the various counting tubes. The effect is to reset the counter device to "zero." This renders all operated triodes in the counter device non-conducting except the left section of tube 14 in decade 4 and the other tubes similarly located in the other decades. The make contacts 192 on relay J close a circuit to relay K which then becomes energized. The break contacts 193 on relay J open the operating circuit to relay L, but the two relays because of their electromagnetic characteristics remain in their previous positions long enough for relay K to energize and be instrumental in initiating operation of relays F and B as will be presently described.

When relay K became operated, relay F became momentarily energized over the following path: ground through the upper winding on relay F, through the make contacts 142 on relay E, through the break contacts 151 on relay F, through the break contacts 161 on relay G, through the break contacts 171 on relay H, through the make contacts 189 on relay K, and through the winding on relay K to —battery. Thereupon relay F effectuates a lock circuit from ground, through the break contacts 188 on the Lock Release switch, through the break contacts 164 on relay G, through the make contacts 153 on relay F and through the lower winding on relay F to —battery. As a result of operation of relay F, make contacts 150 close the operating circuit to relay B. The make contacts 152 close to prepare a partial circuit to relay G which will operate on the next (third) operation of relay K. The break contacts 154 open the lock circuit to relay E thus releasing it to normal and which in turn opens the operating circuit to relay A when the make contacts 140 on relay E open up. De-energization of relay A causes the make contacts 101, 102, 103, 104, 106, 107, 108 and 109 to open up thus preventing the application of positive potential upon the grids of the counting tubes upon subsequent return to normal of relay L. The last to make "Y" contacts 105 open partially the operating circuit to relay L, but an instant later, a partial completion of the operating circuit to relay L is made when the last to make "Y" contact 115 on relay B close. At this moment, relay L returns to normal and its break contacts 180—187 close and impress a positive potential upon the grids of certain tubes in the counter device in accordance with the second preset number thus setting up a counting circuit for the second winding to be wound upon the bobbin. This positive potential found on line 83 is impressed upon the tube grids through the make contacts 111, 112, 113, 114, 116, 117, 118 and 119 found on relay B. Contacts 115 are last to make. But this return of relay L to normal is only momentary because the break contacts 193 on slow-release relay J close at this time and complete an operating circuit to relay L which in turn reoperates and opens all its break contacts thus removing the positive potential which was momentarily impressed upon the tube grids. At this point, the winding machine is set to wind a second predetermined number of turns upon the bobbin; and to continue the winding process, the operator puts the switch 47 to "on" position thereby energizing the winding machine. Subsequent operations involved in winding the third and fourth windings are similar to the above described operations.

After the last of a series of windings is wound upon the bobbin, the winding machine will be stopped as previously described and the counter device with the associated preset circuits will be automatically switched to the original setting so that the winding machine is in readiness to resume winding operation on the next bobbin. Should the wire break during the winding operation, the winding machine is manually stopped by turning switch 47 to "off" position. Then the broken winding is stripped off and the coil winding process restarted by (1) manually operating the Manual Reset switch which sets the counter back to its "zero" position, (2) manually operating the Winding Reset switch so as to cause a return to the same preset circuit and to cause an application of positive potential upon the grids of the particular counting tubes thereby setting up the counter device and, (3) throwing the switch 47 to "on" position whereby the winding machine is restarted. Thus the operation of resetting the counter back to zero and setting the counter back to its predetermined number is accomplished independently of the resetting relay J.

The winding selection is very flexible in that the operator may wind a coil corresponding to any preset number of turns in any manner not restricted to sequential operation. Thus if #1 coil has been wound, coil #4 may next be wound by manually operating the Winding Reset switch. Every time the Winding Reset switch is momentarily depressed, contacts 197 close a circuit to relay K causing it to become energized and to operate the next counting relay. In reference to the example aforementioned, it would be necessary to depress twice the Winding Reset switch in order to operate the fourth counting relay H. As an aid to the operator, visual indication of the counting circuit ready for operation is given by the indicator lamp 43. After commencement of operation, one counting relay with its associated winding relay and indicator lamp will always be energized. Should it become necessary to de-energize this preset circuit, Lock Release switch is provided for this purpose.

While there has been described what is at present considered to be the preferred embodiment of the invention, it will be understood that various modifications may be made therein, and it is intended in the appended claims to cover all such modifications as fall within the true spirit and scope of the invention.

What is claimed is:

1. In a combination with an electronic decimal counter device receiving counting pulses from a pulse generator externally excited, said device progressively and directly indicating the total count after the addition of each succeeding pulse, a plurality of preset circuits over which said counter device may be marked in a plurality of ways, a device manually operated, means operated in response to operation of said device for presetting said circuits corresponding to a plurality of predetermined numbers desired to be counted, said counter device operable responsive to receipt of the final counting pulse of said first predetermined number to be counted for initiating an operating pulse, means operated in response to receipt of said operating pulse for stopping the external excitation, means operated in response to actuation of said stopping means for automatically restoring said counter device to zero position and for switching in sequence the counter device to the next preset circuit set up for the next predetermined number to be counted, other means operable responsive to operation of said switching means for marking the counter device over said next preset circuit, another device manually operated and operatively common to all of said preset circuits, further means operated in response to actuation of said last manually operated device for controlling said restoring and switching means to set the counter device to any one of the plurality of preset circuits whereby the counter device is ready to count to a total of the preset number upon resumption of external excitation.

2. In combination with an electronic decimal counter device receiving counting pulses from a pulse generator actuated electromagnetically by a rotating element mounted on a machine, said counter device progressively and directly indicating the total count after the addition of each succeeding pulse, each pulse corresponding to a single rotation of the element, a plurality of preset circuits over which said counter device may be marked in a plurality of ways, a device manually operated, means operated in response to actuation of said device for presetting said circuits to correspond to a plurality of predetermined numbers desired to be counted, means operated in response to receipt of an operating pulse initiated by the counter device for stopping the operation of the machine after a predetermined number of revolutions have been counted, switching means operated in response to actuation of said stopping means for resetting said counter device to zero and for automatically switching in sequence to the next preset circuit set for the next predetermined number to be counted and for preparing the counter device for the next counting operation, another device manually operable and operatively common to all of said preset circuits, means operated in response to operation of said second device for actuating said switching means to switch out of sequence to any one of the plurality of preset circuits, whereby the counter is prepared to count pulses to a total set in accordance with the preset predetermined number upon subsequent reoperation of the machine.

3. In the combination as claimed in claim 2, another device manually operated, means actuated in response to operation of said device for resetting said counter device to zero at any time independent of the operation of said switching means.

4. In a combination with an electronic decimal counter device receiving pulses from a pulse generator actuated electromagnetically by an element mounted on a rotating member of a coil winding machine, said counter device progressively and directly indicating the total count after the addition of each succeeding pulse, each pulse corresponding to a single rotation of the element, a plurality of preset circuits connectable to said counter device, a first device manually operated, means operated in response to actuation of said first device for presetting said circuits to correspond to a plurality of predetermined numbers, a second device manually operated, means operable responsive to operation of said second device for initially setting said counter device on zero, steering means, circuit counting means, a third device operable by hand, means operated in response to operation of said third device for initially actuating said steering means having sequential control over the circuit counting means, said circuit counting means operated in response to the operation of said steering means for closing one of said preset circuits to said counter device, means for electrically marking the counter device, said marking means operable responsive to operation of said circuit closing means for momentarily marking said counter device over one of said preset circuits, said pulse generator actuated by said rotating element upon actuation of the winding machine, said counter device operable responsive to receipt of the counting pulses for counting up to the predetermined number set by said first device, said counter device operated in response to the final pulse of the preset number for initiating an operating slave pulse, means operable responsive to receipt of said slave pulse for stopping the operation of the winding machine, means operable responsive to actuation of said stopping means for automatically resetting said counter device to zero and for actuating said steering means to automatically control said circuit counting means, said circuit counting means effective in switching automatically from the first preset circuit to the next sequential preset circuit, marking means operable responsive to actuation of the resetting means for marking said counter device over the newly switched preset circuit whereby, upon actuation, the winding machine is ready to wind the next coil in accordance with the next number of turns as preset upon said counter device.

5. In a combination as claimed in claim 4, means operated in response to operation of said third device for resetting said counter to zero and for remarking the counter device over the same preset circuit independent of the operation of said switching means should an operational failure occur during the winding operation necessitating the restarting of the counting process.

6. In a combination as claimed in claim 5, said resetting means operated in response to operation of said stopping means for resetting said counter device to zero and for actuating said steering means to cause the circuit counting means to switch to the first preset circuit upon completion of the last preset count whereby the winding machine is ready for operation.

References Cited in the file of this patent

UNITED STATES PATENTS

| | | |
|---|---|---|
| 2,432,727 | Crothers | Dec. 16, 1942 |
| 2,521,774 | Bliss | Sept. 12, 1950 |
| 2,574,283 | Potter | Nov. 6, 1951 |
| 2,595,519 | Geohgan | May 6, 1952 |

OTHER REFERENCES

"Predetermined Counters for Process Control," article written by Richard J. Blume, appearing in "Electronics" for February 1948. Pages 88–93.